US008095112B2

(12) United States Patent
Chow et al.

(10) Patent No.: US 8,095,112 B2
(45) Date of Patent: Jan. 10, 2012

(54) ADJUSTING SECURITY LEVEL OF MOBILE DEVICE BASED ON PRESENCE OR ABSENCE OF OTHER MOBILE DEVICES NEARBY

(75) Inventors: Richard Chow, Sunnyvale, CA (US); Philippe J. P. Golle, San Francisco, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 707 days.

(21) Appl. No.: 12/196,083

(22) Filed: Aug. 21, 2008

(65) Prior Publication Data

US 2010/0048167 A1    Feb. 25, 2010

(51) Int. Cl.
*H04M 1/66* (2006.01)
(52) U.S. Cl. .............................. 455/410; 455/411; 726/2
(58) Field of Classification Search .......... 455/410–411, 455/414.1–414.3, 456.1–456.3; 380/270; 340/539.11
See application file for complete search history.

(56) References Cited

U.S. PATENT DOCUMENTS

| 7,304,570 B2* | 12/2007 | Thomas et al. ........... 340/539.11 |
| 7,539,723 B2* | 5/2009 | Agrawal et al. ................ 709/203 |
| 2005/0164675 A1* | 7/2005 | Tuulos et al. .................. 455/410 |
| 2006/0090200 A1* | 4/2006 | Oie .................................... 726/7 |
| 2006/0217147 A1* | 9/2006 | Olvera-Hernandez et al. .......................... 455/552.1 |
| 2008/0096526 A1* | 4/2008 | Miettinen et al. ............. 455/411 |
| 2009/0260077 A1* | 10/2009 | Zhu et al. ......................... 726/19 |

* cited by examiner

*Primary Examiner* — Kamran Afshar
*Assistant Examiner* — Kathy Wang-Hurst
(74) *Attorney, Agent, or Firm* — Shun Yao; Park, Vaughan, Fleming & Dowler LLP

(57) ABSTRACT

One embodiment of the present invention provides a method for adjusting security status on a mobile device, the method comprising: collecting security-related contextual information which includes information of nearby mobile devices and/or the geographic location of the intelligent mobile device; evaluating a threat level based on the collected security-related contextual information; invoking a security policy; and adjusting the security status of the mobile device based on the threat level and the security policy.

24 Claims, 6 Drawing Sheets

ADJUSTING SECURITY LEVEL OF MOBILE DEVICE BASED ON PRESENCE OR ABSENCE OF OTHER MOBILE DEVICES NEARBY

BACKGROUND

1. Field

The present disclosure relates to mobile devices. More specifically, the present disclosure relates to an intelligent mobile device that can adjust its security status based on contextual information such as the presence or absence of nearby mobile devices, geographic location, and temporal information.

2. Related Art

Recent developments of mobile computing technologies have allowed unprecedented integration of various functions into a single mobile device. For example, in addition to traditional voice communication, a smart-phone user can now perform financial transactions, download business related documents, and exchange data/video/audio files with other mobile device users. Many of the aforementioned applications deal with sensitive personal or corporate information; thus security issues related to mobile devices are increasingly a source of concern.

Compared with traditional stationary devices such as a desktop computer, the unique features of mobile devices present unique security challenges. For example, the compactness and the mobility of a mobile device make it vulnerable to theft and loss, which can create a serious security breach if the thief can access sensitive personal or corporate information stored in the stolen mobile device. In addition, commonly used authentication processes often require inputting, sometimes more than once, information such as login ID and password, and for a mobile device lacking a fully functional keyboard, such a process is inconvenient to the user. More over, a strictly enforced security enhancement procedure sometimes may hamper the performance of a mobile device due to the limited amount of memory and usable power therein.

SUMMARY

One embodiment of the present invention provides a method for adjusting security status on a mobile device, the method comprising: collecting security-related contextual information which includes information of nearby mobile devices and/or the geographic location of the intelligent mobile device; evaluating a threat level based on the collected security-related contextual information; invoking a security policy; and adjusting the security status of the mobile device based on the threat level and the security policy.

In a variation on this embodiment, adjusting the security status of the mobile device involves one or more of the following operations: increasing or lowering a user authentication requirement, changing the order of suggested email addresses in an address auto-complete field, suggesting that an open document be saved in a designated folder, and imposing a set of security policies to documents in a designated folder.

In a variation on this embodiment, collecting the security-related contextual information includes detecting at least one of the following: a current time, a wireless network to which the intelligent mobile device is in communication with, and an accelerometer trace.

In a variation on this embodiment, the collecting of security-related contextual information automatically starts when the device is turned on.

In a variation on this embodiment, the collecting of security-related contextual information is manually started.

In a variation on this embodiment, the method includes maintaining a list of known mobile devices and/or known geographic locations, and comparing the collected security-related contextual information with the list.

In a further variation on this embodiment, the method further includes allowing the mobile device user to manually input the list.

In a further variation on this embodiment, the method further includes acquiring the list using a self-training process.

DETAILED DESCRIPTION

The following description is presented to enable any person skilled in the art to make and use various embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method for adjusting security status on a mobile device. The mobile device collects contextual information of nearby mobile devices which can be used to analyze a threat level of the device. Based on its current threat level, the mobile device can intelligently relax or tighten its security status, thus providing more user flexibility without sacrificing security.

During operation, the mobile device collects security-related contextual information, including but not limited to: identification of other nearby mobile devices, its own geographic location, current time, and current wireless network to which it is in communication with. The mobile device then evaluates its current threat level based on the collected contextual information. The threat level is then sent to an authentication engine that resides either in the mobile device or on a remote server. The authentication engine subsequently adjusts the security status for the mobile device based on a security policy and the threat level.

Discovering Nearby Mobile Devices

Figure 1A:
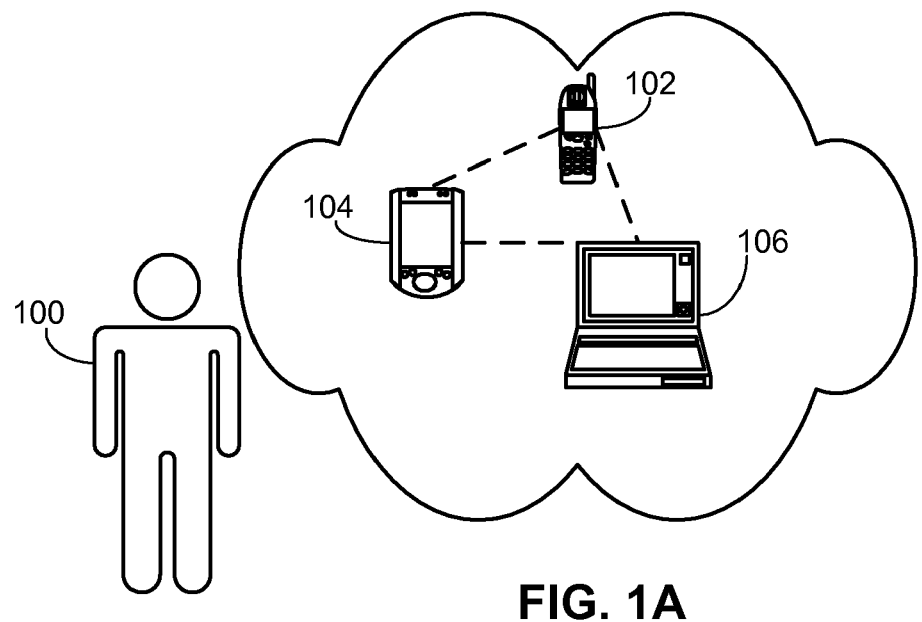
FIG. 1A illustrates multiple mobile devices carried by one user communicating with each other in accordance with one embodiment of the present invention.

A mobile device can acquire different contextual information of other mobile devices nearby using various methods. FIG. 1A shows an example of a user 100 carrying a plurality of mobile devices, including but not limited to: a mobile phone 102, a personal digital assistant (PDA) 104, and a laptop computer 106. Each mobile device can communicate with other devices that belong to the same owner using a peer-to-peer communication technique such as Bluetooth™ and/or infrared communication. In one embodiment, a respective mobile device can detect other devices that belong to the same user. For example, a mobile device can maintain a list of the identities of all the mobile devices of the same user. The detection of other nearby mobile devices that belong to the same user indicates a reduced likelihood of the device being stolen. Note that the mobile device can use a variety of protocols to identify nearby devices as known or unknown devices. For example, the mobile device can use Bluetooth or WiFi MAC addresses to identify other devices. Other communication protocols and technologies that can provide a fingerprint to a device can also be used.

Figure 1B:
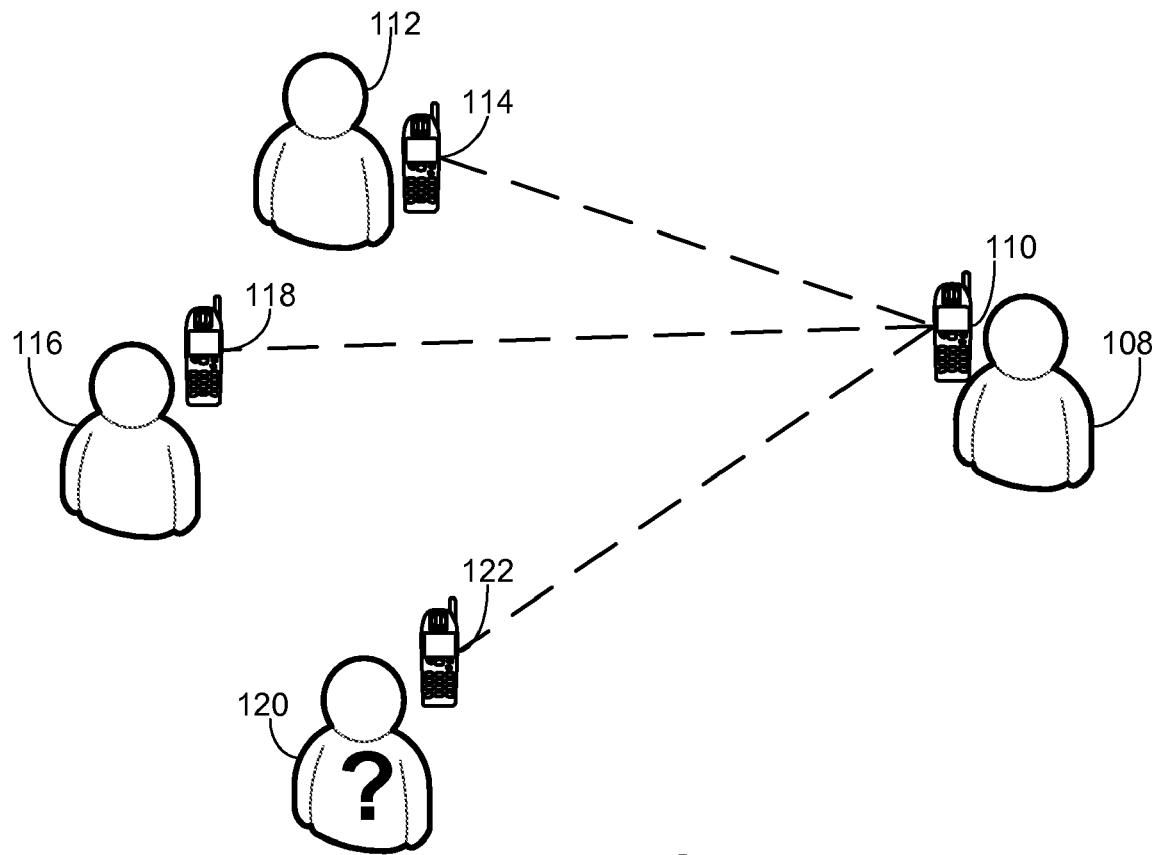
FIG. 1B illustrates a mobile phone communicating with other mobile phones nearby in accordance with one embodiment of the present invention.

FIG. 1B shows an example of a user 108 carrying a mobile phone 110. In one embodiment, mobile phone 110 scans its surrounding and communicates with nearby mobile devices including a mobile phone 114 carried by user 112, a mobile phone 118 carried by user 116, and a mobile phone 122 carried by user 120. Using a peer-to-peer communication technique such as Bluetooth™, mobile phone 110 detects nearby mobile phones 114, 118, and 122, and identifies mobile phones 114 and 118 as known devices that belong to colleagues, friends, or family members (users 112 and 116) of user 108. However, mobile phone 110 recognizes mobile phone 122 as belonging to an unknown user 120.

As described in the example above, detecting the identities of other mobile devices nearby makes it possible for a mobile device to determine its likely location and thus physical security level. For example, if mobile device 110 is surrounded by a number of known mobile devices, it is most likely that mobile device 110 is physically secured by its rightful owner, user 108. Therefore, mobile device 110 can relax its security status to allow more user flexibility. For example, mobile device 110 can allow a simplified authentication procedure for user 108 to access locally stored data without the need of inputting a password. On the other hand, if mobile device 110 detects no known mobile devices nearby or, alternatively, a number of unknown mobile devices nearby, such as unknown mobile device 122, it can tighten its security status and require more authentication information from its user. In some cases, mobile device 110 may block any attempts to access its most sensitive personal or corporate data.

To facilitate identifying known mobile devices, mobile phone 110 may keep one or more lists of known mobile devices and their related information. For example, mobile phone 110 may have one list of mobile devices that belong to family members, one list of mobile devices that belong to colleagues, and one list of mobile devices that belong to friends, and so on. Such lists can also be shared among a group of users.

Figure 1C:
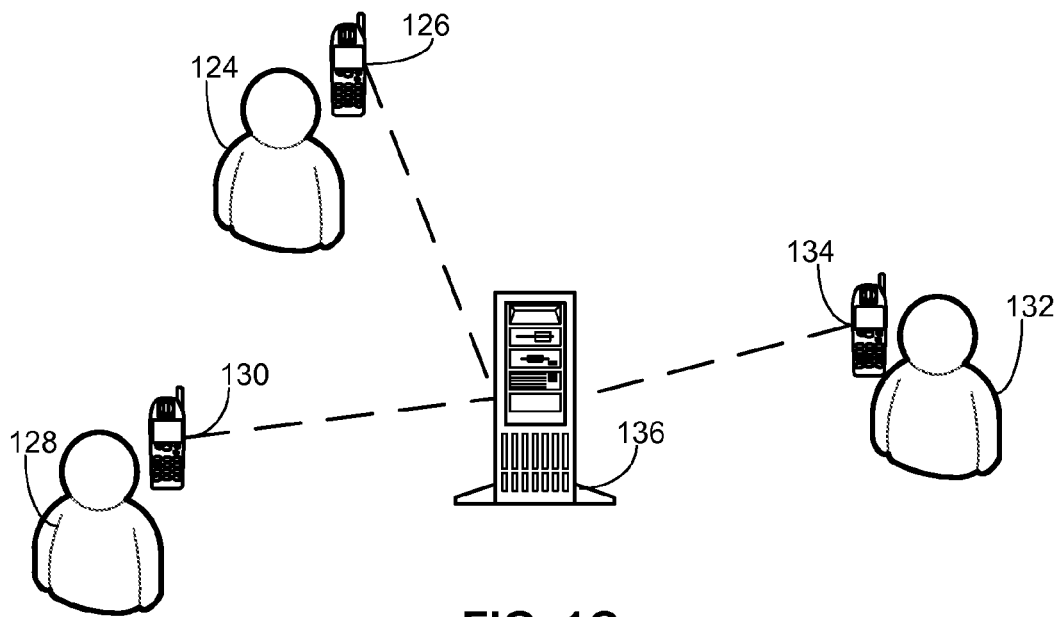
FIG. 1C illustrates multiple mobile phones communicating with each other through a centralized server in accordance with one embodiment of the present invention.

In addition to direct communication with nearby mobile devices, a mobile device can also use a centralized infrastructure to discover other nearby mobile devices. FIG. 1C illustrates such an example, in which users 124, 128, and 132 carrying mobile phones 126, 130, and 134, respectively, communicate with a centralized server 136 using WiFi technology. Server 136 can notify a respective mobile device of any other nearby known mobile devices. If a mobile device is notified of the presence of many other known mobile devices, the mobile device can determine that its surroundings are safe and lower its security status. In contrast, if the mobile device is notified of the absence of any other known mobile devices, it can tighten its security status.

Figure 1D:
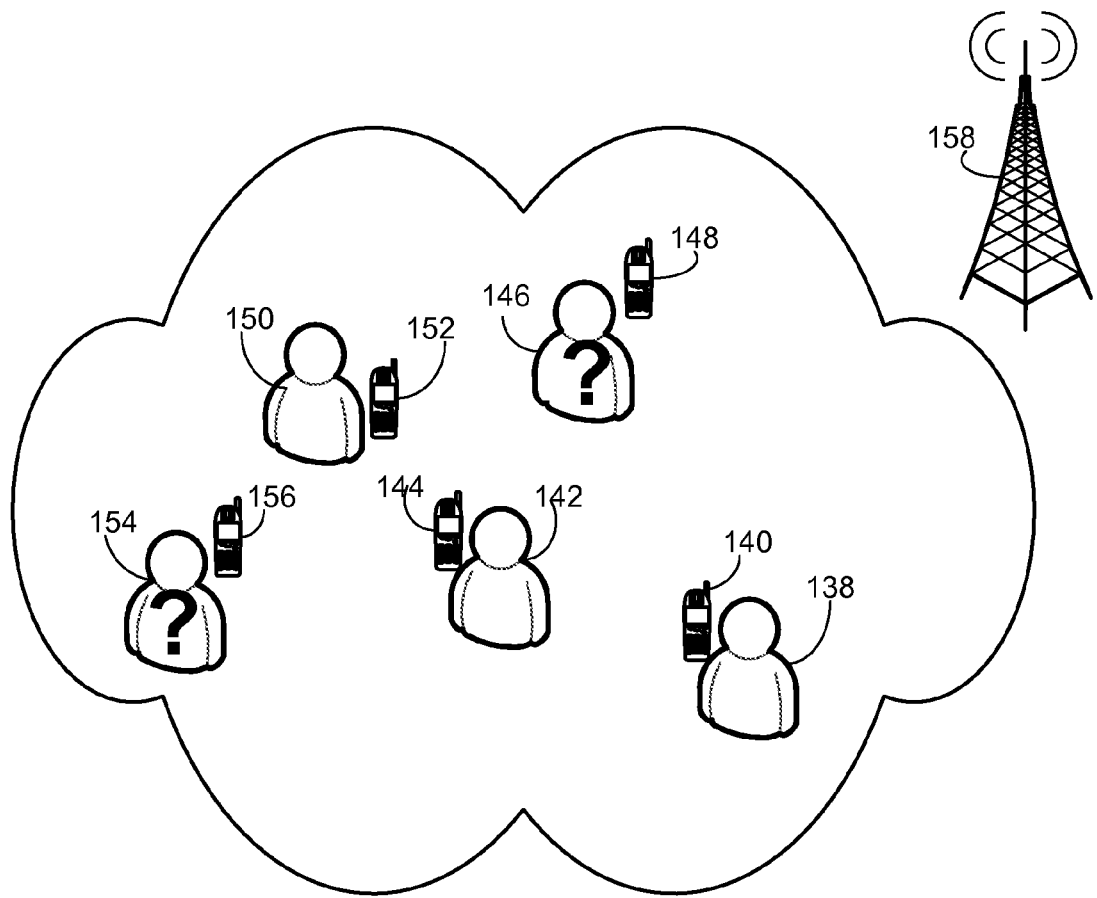
FIG. 1D illustrates a mobile phone receiving information about other mobile phones nearby from the service carrier in accordance with one embodiment of the present invention.

FIG. 1D shows another method that can be used by a mobile device to discover nearby mobile devices. In FIG. 1D, users 138, 142, 146, 150, and 154, are carrying mobile phones 140, 144, 148, 152, and 156, respectively. Mobile phones 140, 144, 148, 152, and 156 all belong to the same carrier network receiving signals from a wireless transmission tower 158. Carrier signal sent by wireless transmission tower 158 notifies mobile phone 140 of the presence of nearby mobile phones 144, 148, 152, and 156. Mobile phone 140 identifies mobile phones 144 and 152 as being known devices that belong to friendly users 142 and 150, respectively, and mobile phones 148 and 156 as belonging to unknown users 146 and 154, respectively. As discussed before, the presence of known mobile devices indicates safe surroundings, whereas the presence of unknown mobile devices indicates unsafe surroundings; consequently, the mobile device adjusts its security status based on the identification of other nearby mobile devices.

Note that the examples described above use mobile phones as representative mobile devices. The described security-adjustment mechanism can apply to a variety of devices, including but not limited to PDA and laptop computer.

Collecting Other Contextual Information

Figure 2:
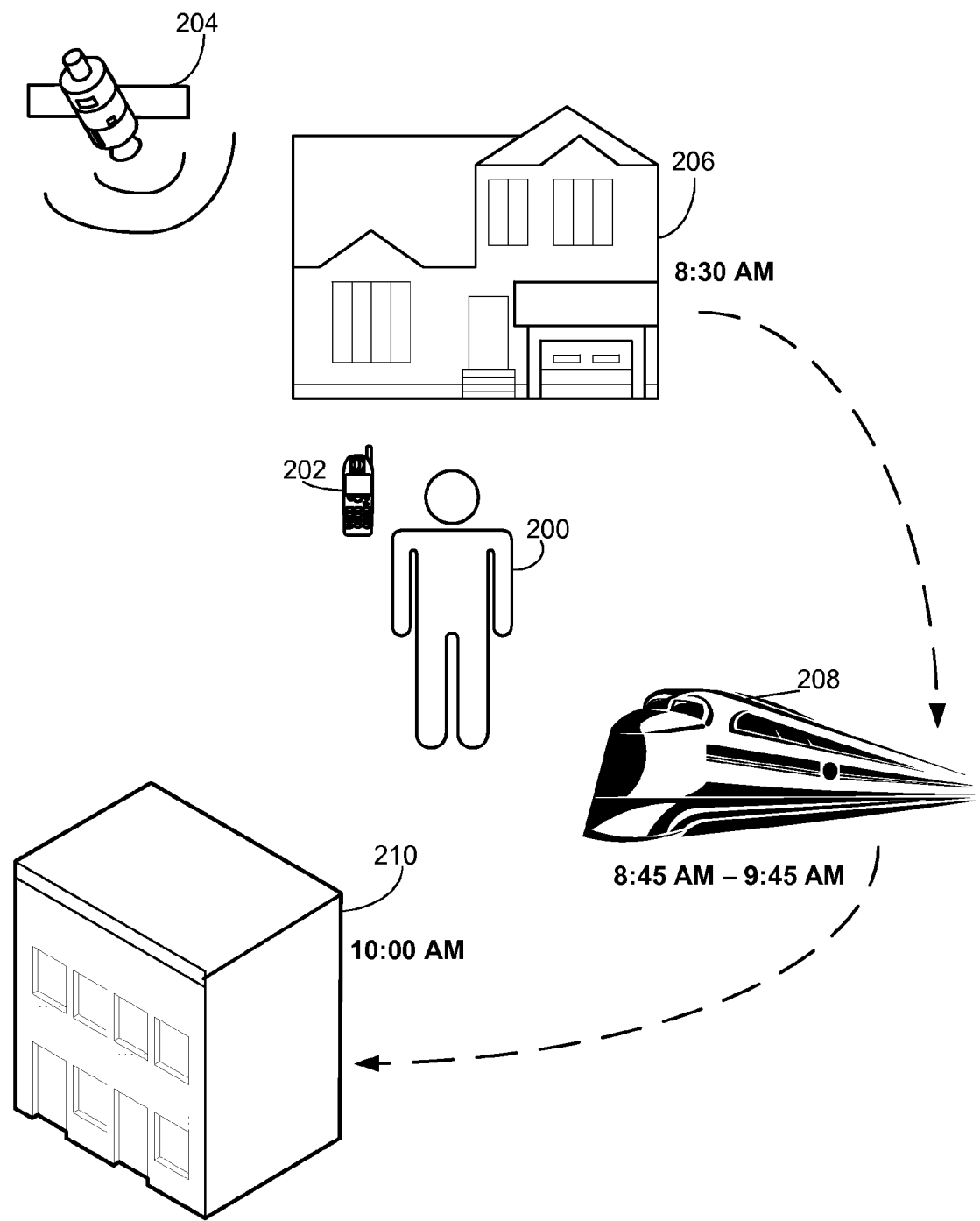
FIG. 2 illustrates a user's exemplary daily activity routine in accordance with one embodiment of the present invention.

In addition to discovering nearby mobile devices, a mobile device can also collect other types of contextual information that can be used to adjust its security status. For example, the current geographic location of a mobile device can provide valuable information about its threat level. As shown in FIG. 2, a mobile phone 202 carried by a user 200 receives a GPS signal from satellite 204 indicating its current geographic location. Mobile phone 202 can compare its current geographic location with known geographic locations such as user 200's home 206 and office building 210.

If mobile phone 202 determines that it is inside the home of its rightful owner, then when user 200 is requesting a service from a remote service provider, such as accessing his bank account information, mobile device 202 can report its current threat level as "secure" to the bank server, which in turn relaxes the authentication procedure for user 200. However, if mobile phone 202 determines that it is in an unfamiliar geographic location, then when user 200 attempts to access his bank account, mobile device 202 will report its threat level as "not secure" to the bank server, which in turn requires more authentication information from user 200. For example, instead of the standard user name and password, the bank server may request user 200 to input other authentication information such as mother's maiden name or answers to other secret questions.

If mobile phone 202 determines that it is in office building 210, mobile phone 202 can assume it is in a protected business or work environment. Therefore, when the user is accessing corporate information, for example, accessing corporate data files through a virtual-private-network (VPN), mobile phone 202 can notify the VPN manager that it is currently inside the corporate building, and the VPN manager may allow a simplified user login procedure, such as allowing the user to stay logged in for a longer time period. Again, the relaxed security status allows more user flexibility.

Similar to keeping a list of known mobile devices, mobile phone 202 can keep a list of safe geographic locations, such as the user's home and office. For a corporation with a plurality of buildings, a list of geographic locations of all the buildings can be shared among all employees.

In addition to geographic location, mobile phone 202 can also collect temporal information, which can be used to determine the threat level of a mobile device when combined with geographic location information. FIG. 2 illustrates such an example. In FIG. 2, user 200 carrying mobile phone 202 follows a daily activity routine. Every morning, at 8:30, user 200 leaves his home 206; and at 8:45, user 200 boards a commuter train 208 heading to work. User 200 spends an hour on train 208 and arrives at his office building 210 at 10:00. Mobile phone 202 tracks both its geographic location and the corresponding time, and compares the combined information with user 200's daily routine. For example, mobile phone 202 may detect its current geographic location along the train route between user's home 206 and office 210, and the current time as 9:00 am. Based on this information and the known daily activity routine of user 200, mobile phone 202 determines that it is currently in a safe environment, although mobile phone 202 may be surrounded by many other unknown mobile devices. In one embodiment of the present invention, when user 200 is on commuter train 208 at his regular commuting time, mobile phone 202 detects its nearby mobile devices as belonging to unknown users; however, if these nearby mobile devices are the same pack of mobile devices being detected daily, mobile phone 202 can determine that these nearby unknown mobile devices belong to user 200's fellow commuters and do not indicate being in an unsafe environment.

Mobile phone 202 can obtain user 200's daily activity routine by receiving an input from user 200, or by going through a self-training process. For example, mobile phone 202 can be set into a training mode and record time-correlated geographic locations for a period of time. At the end of the training process, mobile device 202 analyzes the recorded information to summarize user 200's daily routine.

Other contextual information includes, but is not limited to, the current wireless network to which the mobile device is connected and a recent accelerometer trace. If the mobile device determines it is connected to a secured wireless network, such as a known firewall-protected corporate wireless network, the mobile device can relax its security status. In addition, each user walks with a unique pattern, which can be detected and recorded by an accelerometer installed in the mobile device. By comparing the current accelerometer trace with the pre-recorded one, the mobile device can determine if it is indeed being carried by its rightful owner.

Adjusting Security Status

Figure 3A:
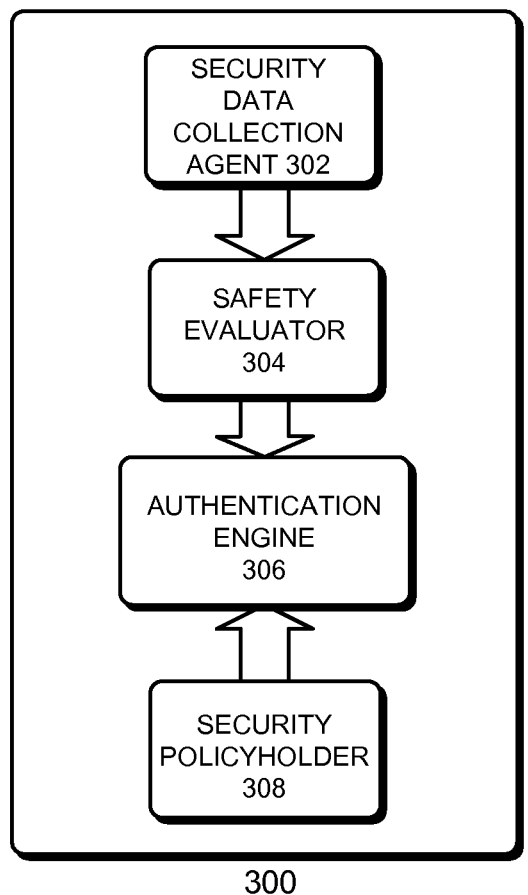
FIG. 3A illustrates an exemplary architecture of a security mechanism in a mobile device in accordance with one embodiment of the present invention.

FIG. 3A shows an exemplary architecture of a security mechanism of a mobile device 300 which is capable of intelligently adjusting its own security status in accordance with one embodiment of the present invention. Mobile device 300 includes a security data collection agent 302 which collects security-related contextual information, including but not limited to: identity of nearby mobile devices, geographic location, temporal information, wireless network to which mobile device 300 is connected to, and recent accelerometer trace. Mobile device 300 also includes a safety score evaluator 304 which evaluates the current threat level based on security-related contextual information provided by security data collection agent 302. An authentication engine 306 receives the current threat level and adjusts the security status for mobile device 300 based on the current threat level and a security policy retrieved from a security policyholder 308. In one embodiment of the present invention, if the current threat level is higher than a threshold value, authentication engine 306 allows a user to access a locally stored data file without entering a password; otherwise, the user is required to enter a password in order to access the data file. On the other hand, if the current threat level is lower than a threshold value, authentication engine 306 may block any attempts to access locally stored data files. In an extreme scenario, authentication engine 306 may instruct the mobile device to erase all locally stored data files if the threat level is extremely low.

Figure 3B:
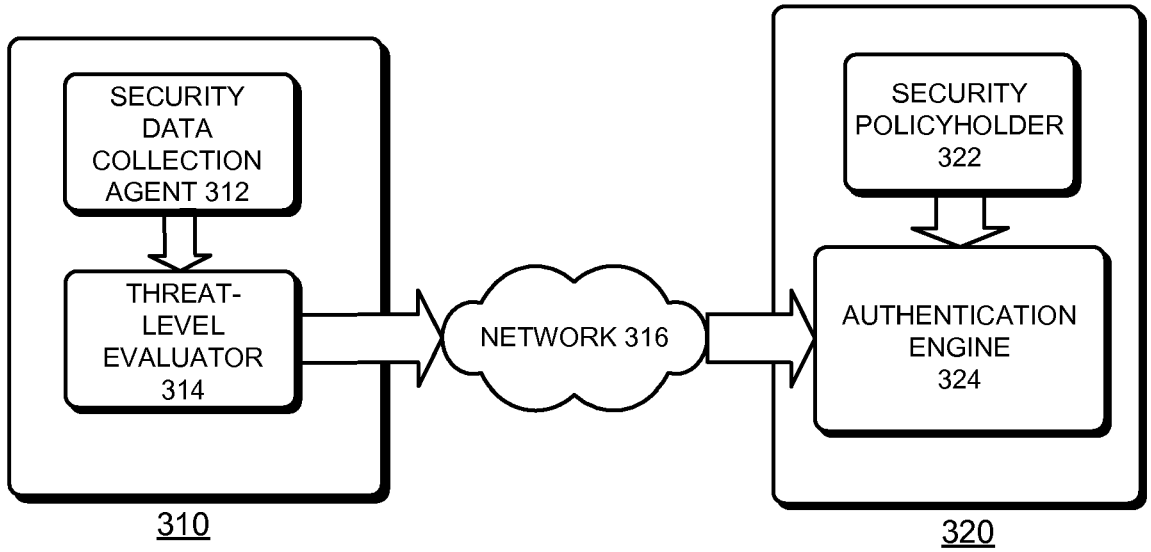
FIG. 3B illustrates exemplary security and communication mechanism of a mobile device and a remote server in accordance with one embodiment of the present invention.

FIG. 3B shows an exemplary security and communication mechanism of a mobile device 310 and a remote server 320 in accordance with one embodiment of the present invention. Similarly to the example shown in FIG. 3A, mobile device 310 includes a security data collection agent 312 and a threat-level evaluator 314. Security data collection agent 312 collects security-related contextual data and feeds the data to threat-level evaluator 314, which evaluates the current threat level. When mobile device 310 is running an application on a remote server 320, threat-level evaluator 314 sends the current threat level of mobile device 310 to remote server 320 through a network 316. An authentication engine 324 running on remote server 320 receives the current threat level of mobile device 310 and adjusts the safety setting of mobile device 310 based on a security policy retrieved from a security policyholder 322. In one embodiment of the present invention, if the current threat level of mobile device 310 is higher than a threshold value, authentication engine 324 allows a user to run an application on remote server 320 with a relaxed security procedure, such as allowing the user to stay logged in for a longer time period.

Figure 4:
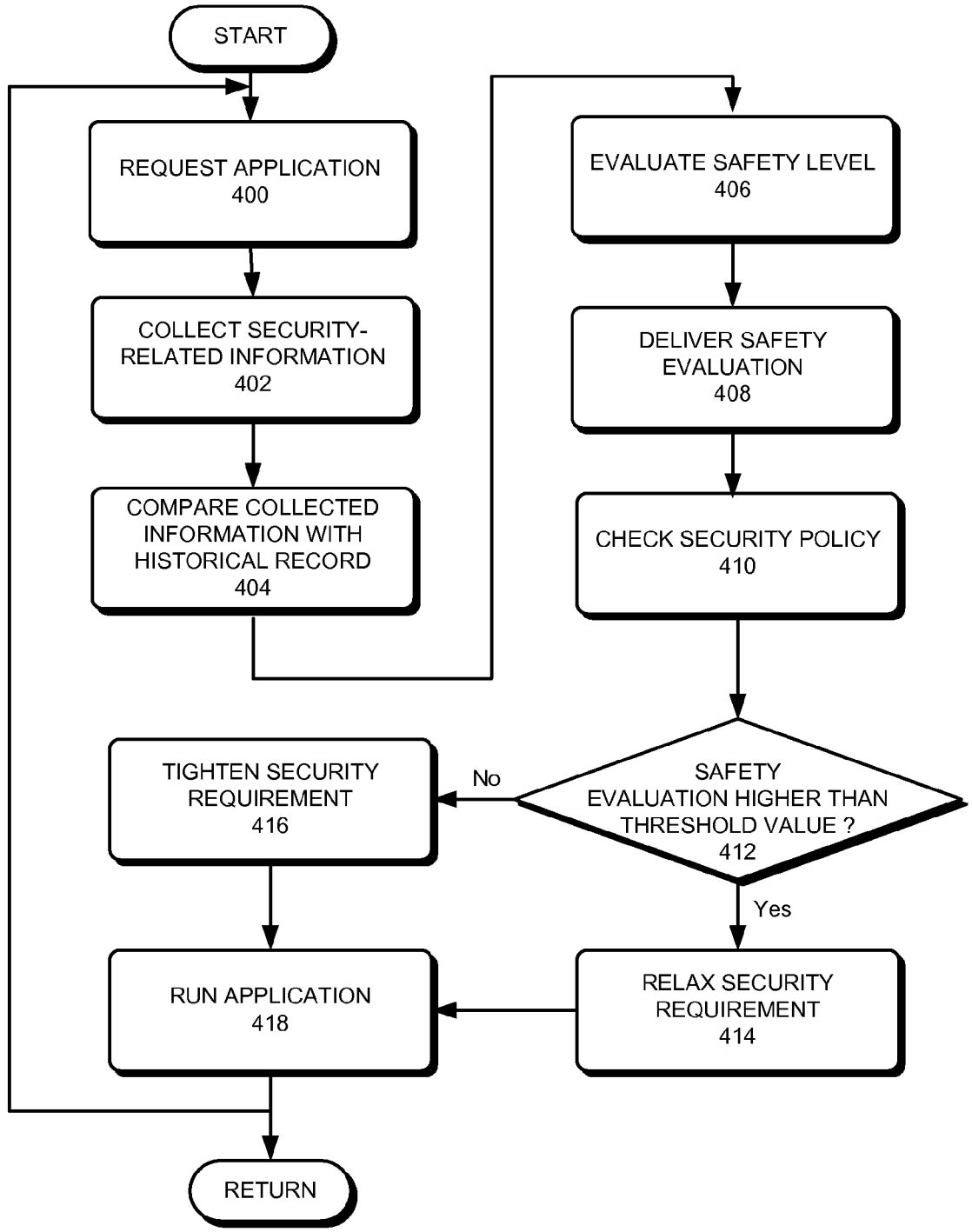
FIG. 4 presents a flowchart illustrating an exemplary process for adjusting the security status of a mobile device in accordance with one embodiment of the present invention.

FIG. 4 presents a flowchart illustrating an exemplary process for adjusting the security status of a mobile device in accordance with one embodiment of the present invention. During operation, the mobile device requests to run an application, either locally or remotely (operation 400). The mobile device further collects security-related contextual information (operation 402). Optionally, the mobile device compares the collected information with the historical record, such as the user's daily activity routine or accelerometer trace record (operation 404). The mobile device then evaluates the current threat level based on the collected contextual information (operation 406). Next, the mobile device delivers the threat level to an authentication engine (operation 408). Depending on whether the application is local (e.g., accessing a locally stored data file) or remote (e.g., accessing data from a remote server), the mobile device sends threat level to the authentication engine on either the mobile device or the remote server, respectively.

The authentication engine then checks an application-specific security policy which contains safety threshold values (operation 410). Note that the threshold safety values can be different for different applications. For example, financial transactions often require a safety threshold value higher than the one required for checking emails. Subsequently, the mobile device compares threat level with the threshold value (operation 412). If the threat level is higher than the threshold value, the authentication engine relaxes the security status for running the application (operation 414). If the threat level is lower than the threshold value, the authentication engine tightens the security status (operation 416). The mobile device then runs the application using the adjusted security status (operation 418). After running the current application, the mobile device proceeds to run another application (operation 400).

Note that, instead of collecting security-related contextual information each time the mobile device requests an application, the mobile device can be programmed to collect security-related contextual information and evaluate threat levels at certain time intervals. If the threat level changes during the process of running an application (for example, the user steps outside of his home or office), the authentication engine can adjust the security status for running the same application accordingly. In one embodiment, the mobile device can start collecting security-related contextual information automatically when the device is turned on by the user. In another embodiment, the mobile device can start collecting security-related contextual information after the user manually configures the device.

In some embodiment of the present invention, a mobile device can facilitate additional context-aware security-related functions. In one embodiments, the mobile device can improve its email security by leveraging the device-proximity information to improve the security features in email addressing. For example, if a user's mobile device is in close proximity to those of colleagues, this proximity information can be used to infer that the user is at work, and the mobile device can use this knowledge in making intelligent decisions as to what address to use when providing the auto-address-complete function which is available in many email client programs. For instance, the mobile device might place the address "smith@company.com" above "smith@gmail.com" in the user selection window when the user has only entered "smith" in the address field, since the former is the work address of a co-worker and the latter is the private address of a friend.

In a further embodiment, the mobile device can also use the proximity information to improve content security and management. For example, if the user's mobile device senses other devices which belong to the user's project collaborators in its immediate proximity, then it might suggest that documents open on the user's mobile device be filed in the project folder and security policies relevant to the project be applied. For instance, the mobile device might scan the documents in the project folder for certain keywords related to the project before allowing such documents to be sent out of an enterprise.

Figure 5:
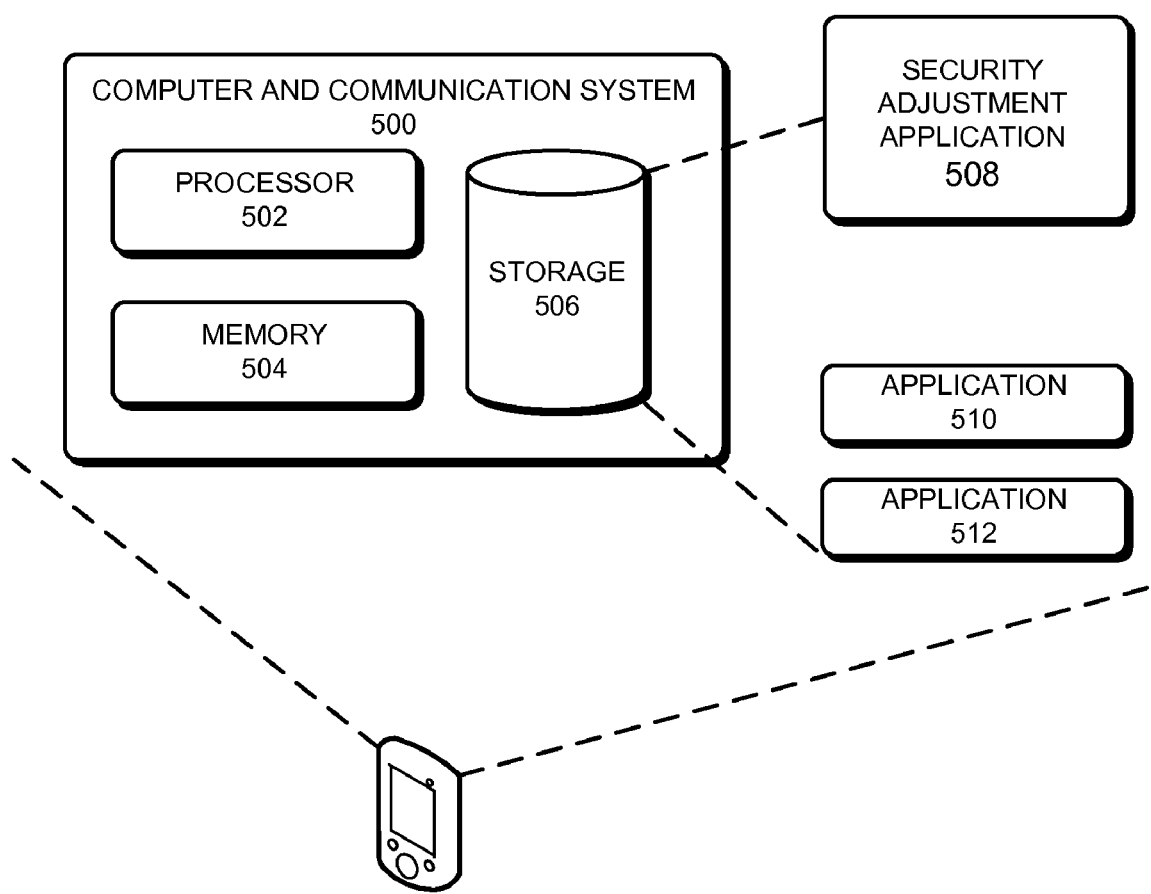
FIG. 5 illustrates an exemplary computer system for adjusting its security status based on nearby mobile devices in accordance with one embodiment of the present invention.

FIG. 5 illustrates an exemplary computer system for adjusting its security status in accordance with one embodiment of the present invention. In one embodiment, a computer and communication system 500 includes a processor 502, a memory 504, and a storage device 506. Storage device 506 stores a security adjustment application 508, as well as other applications, such as applications 510 and 512. In one embodiment, security adjustment application 508 further includes a program that facilitates the adjustment of the security status of the mobile device using one or more of the aforementioned method. During operation, security adjustment application 508 is loaded from storage device 506 into memory 504 and then executed by processor 502. While executing the program, processor 502 performs the aforementioned functions.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the various embodiments is defined by the appended claims.

What is claimed is:

1. A method for adjusting security status on a mobile device, the method comprising:
    collecting security-related contextual information which includes information of a nearby mobile device, wherein collecting the security-related contextual information further includes detecting an accelerometer trace;
    evaluating a threat level based on the collected security-related contextual information, which involves determining whether the nearby mobile device is a known mobile device;
    invoking a security policy; and
    adjusting the security status of the mobile device based on the threat level and the security policy.

2. The method of claim 1, wherein adjusting the security status of the mobile device comprises one or more of the following operations:
    increasing or lowering a user authentication requirement;
    changing the order of suggested email addresses in an address auto-complete field;
    suggesting that an open document be saved in a designated folder; and
imposing a set of security policies on documents in a designated folder.

3. The method of claim 1, wherein collecting the security-related contextual information further includes detecting at least one of the following:
    a current time; and
    a wireless network to which the mobile device is in communication with.

4. The method of claim 1, wherein the collecting of security-related contextual information automatically starts when the device is turned on.

5. The method of claim 1, wherein the collecting of security-related contextual information is manually started.

6. The method of claim 1, further comprising:
    maintaining a list of known mobile devices and/or known geographic locations; and
    comparing the collected security-related contextual information with the list.

7. The method of claim 1, further comprising:
    allowing the mobile device user to manually input the list.

8. The method of claim 1, further comprising:
    acquiring the list using a self-training process.

9. A mobile device that self-adjusts a security status, the device comprising:
    a security data collection agent that collects security-related contextual information which includes information of a nearby mobile device, wherein the security-related contextual information includes an accelerometer trace;

a threat level evaluator that evaluates a current threat level based on the collected security-related contextual information by determining whether the nearby mobile device is a known mobile device;

a security policy holder that stores a set of security policies; and an authentication engine that adjusts the security status of the mobile device based on the threat level and the security policies.

10. The mobile device of claim 1, wherein
while adjusting the security status of the mobile device, the authentication engine is configured to perform one or more of the following operations:
increasing or lowering a user authentication requirement;
changing the order of suggested email addresses in an address auto-complete field;
suggesting that an open document be saved in a designated folder; and
imposing a set of security policies on documents in a designated folder.

11. The mobile device of claim 1,
wherein the security-related contextual information includes at least one of the following:
a current time; and
a wireless network to which the mobile device is in connection with.

12. The mobile device of claim 1,
wherein the security data collection agent starts collecting security-related information automatically when the device is turned on.

13. The mobile device of claim 1,
wherein the security data collection agent starts collecting security-related information when manually configured by a user.

14. The mobile device of claim 1, further comprising:
a list of known mobile devices and/or known geographic locations.

15. The mobile device of claim 1,
wherein the list is manually inputted by the mobile device user.

16. The mobile device of claim 1,
wherein the list is acquired by the mobile device using a self-training process.

17. A non-transitory computer-readable medium storing instructions which when executed by a computer cause the computer to perform a method for adjusting security status on an intelligent mobile device, the method comprising:

collecting security-related information which includes information of a nearby mobile device, wherein collecting the security-related information further includes detecting an accelerometer trace;

evaluating a threat level based on the collected security-related contextual information, which involves determining whether the nearby mobile device is a known mobile device;

invoking a security policy; and adjusting security status of the mobile device based on the threat level and the security policy.

18. The computer-readable medium of claim 1, wherein adjusting the security status of the mobile device comprises performing one or more of the following operations:
increase or lowering a user authentication requirement;
changing the order of suggested email addresses in an address auto-complete field;
suggesting that an open document be saved in a designated folder; and
imposing a set of security policies on documents in a designated folder.

19. The computer-readable medium of claim 1, wherein collecting the security-related information further includes detecting at least one of the following:
a current time; and
a wireless network to which the mobile device is in communication with.

20. The computer-readable medium of claim 1,
wherein the collecting of security-related contextual information automatically starts when the device is turned on.

21. The computer-readable medium of claim 1,
wherein the collecting of security-related contextual information is manually started.

22. The computer-readable medium of claim 1, wherein the method further comprises:
maintaining a list of known mobile devices and/or known geographic locations; and
comparing the collected security-related information with the list.

23. The computer-readable medium of claim 1, wherein the method further comprises:
allowing the mobile device user to manually input the list.

24. The computer-readable medium of claim 1, wherein the method further comprises:
acquiring the list using a self-training process.

* * * * *